United States Patent
Hassell et al.

(10) Patent No.: US 7,100,193 B2
(45) Date of Patent: Aug. 29, 2006

(54) RATE CONTROLLED INSERTION OF ASYNCHRONOUS DATA INTO A SYNCHRONOUS STREAM

(75) Inventors: Joel Gerard Hassell, Arvada, CO (US); Steven Jon Reynolds, Littleton, CO (US); Thomas Lemmons, Evergreen, CO (US); Ian Zenoni, Highlands Ranch, CO (US); Tom Huber, Parker, CO (US)

(73) Assignee: Intellocity USA, Inc., Denver, CO (US)

(*) Notice: Subject to any disclaimer, the term of this patent is extended or adjusted under 35 U.S.C. 154(b) by 1020 days.

(21) Appl. No.: 09/816,906

(22) Filed: Mar. 23, 2001

(65) Prior Publication Data

US 2001/0050920 A1    Dec. 13, 2001

Related U.S. Application Data

(60) Provisional application No. 60/193,405, filed on Mar. 29, 2000.

(51) Int. Cl.
    *H04N 7/16* (2006.01)
(52) U.S. Cl. ............... 725/136; 725/138; 725/139; 725/140; 725/142
(58) Field of Classification Search ............ 725/116, 725/117, 138, 136, 137, 114, 118, 131–132, 725/134, 139–140, 142, 144–146, 148, 151–152; 348/473, 478; 370/465, 529, 503
See application file for complete search history.

(56) References Cited

U.S. PATENT DOCUMENTS

| | | | | |
|---|---|---|---|---|
| 5,818,441 A | | 10/1998 | Throckmorton et al. | 345/328 |
| 6,181,711 B1 | * | 1/2001 | Zhang et al. | 370/468 |
| 6,357,042 B1 | * | 3/2002 | Srinivasan et al. | 725/32 |
| 6,415,438 B1 | * | 7/2002 | Blackketter et al. | 725/136 |
| 6,738,972 B1 | * | 5/2004 | Willard et al. | 718/103 |

FOREIGN PATENT DOCUMENTS

| | | |
|---|---|---|
| EP | 758 833 A2 | 2/1997 |
| EP | 758 833 A3 | 10/1997 |
| EP | 868 087 A2 | 9/1998 |
| WO | WO 97/35435 | 9/1997 |

* cited by examiner

*Primary Examiner*—Ngoc Vu
(74) *Attorney, Agent, or Firm*—Morrison & Foerster LLP (57) ABSTRACT

Disclosed is a system and method that provides rate controlled insertion of asynchronous data into a synchronous stream in a broadcast system. A calculation of the transmission time for an asynchronous data file is determined from the file size, available data transfer rate, redundancy transmission factor, bandwidth scale factor and connect time latency. Transmission time may be employed to schedule transmission of asynchronous data for use at a predetermined time. Transmission time for multiple files may be combined to determine a transmission start time for a first file such that a last asynchronous file is transmitted by a predetermined time.

4 Claims, 8 Drawing Sheets

RATE CONTROLLED INSERTION OF ASYNCHRONOUS DATA INTO A SYNCHRONOUS STREAM

CROSS REFERENCE TO RELATED APPLICATIONS

This application claims the benefit of U.S. provisional application Ser. No. 60/193,405 filed Mar. 29, 2000 entitled "Rate Controlled Insertion of Asynchronous into a Synchronous Stream."

BACKGROUND OF THE INVENTION a. Field of the Invention

The invention pertains to the transmission of metadata in conjunction with a broadcast stream and more specifically to a method and system of managing asynchronous data insertion into a synchronous stream.

b. Description of the Background

Broadcast television programs may be enhanced through the display of metadata in conjunction with a displayed program. Metadata is data associated with an audio/video stream, and need not be aural or pictorial in nature. Metadata may comprise scores for sporting events, text information for news programs, Internet links to additional information, or other information. For example, displaying statistics for a particular car or driver when the televised image shows the car or driver may enhance an automobile race.

Standards such as the Enhanced Content Specification from the Advanced Television Enhancement Forum (ATVEF) provide a foundation for HTML enhanced television. The specification employs triggers in a broadcast stream to initiate presentation of metadata. Receivers must be able to cache one megabyte of information comprising enhanced content and audio/video stream data. Enhanced content is transferred to the receiver prior to receipt of the trigger. Enhanced content may be contained in the broadcast stream or transferred over a separate network such as the Internet, for example.

Two transport types are defined in the ATVEF Enhanced Content Specification. Type A transport employs an independent communication path to request and receive enhanced content information. Type B transport contains enhanced content information in the broadcast stream. As such, transport type B can run on TV broadcast networks without Internet connections, unlike transport type A.

The bandwidth of type B transport is shared between program content, enhanced content, and other information, such as control information or captioning, for example. Type B transport systems may provide an isochronous channel (minimum constant data rate) for enhanced content metadata transfer.

In type A transport, a network connection may be permanently connected, currently connected, or not connected. Permanently connected network connections may include cable modem and DSL connections. Currently connected and currently not connected networks may comprise dial up connections. Type A transport network connections exhibit bandwidth and latencies that may vary with type of connection, speed of connection, number of users and other factors.

Transmission of enhanced content to a receiver must be initiated at a time sufficiently in advance of the associated trigger to allow transfer and storage of the enhanced content information. The interval of time required to transfer the enhanced content may vary depending on available bandwidth, size of the metadata file, and redundancy of transmission, plus other factors. A metadata file may be transmitted more than once to reduce the likelihood of errors in the stored file.

The number of enhanced content events that may occur can be maximized by starting transfers of metadata at a time such that data is stored 'just in time' in the receiver cache for utilization in response to a trigger.

Alternatively, if there are a predetermined number of triggers for a broadcast program, providing a method of transfer wherein metadata arrives just in time for utilization allows maximum data size for each trigger event. Increased data size may be employed to offer higher quality images and graphics.

In order to maximize the number of enhancement events that may be produced with a predetermined bandwidth, or to maximize the data size that may be transferred for a trigger event, a new method of managing transfer of metadata is needed.

SUMMARY OF THE INVENTION

The present invention overcomes the disadvantages and limitations of the prior art by providing a method for insertion of asynchronous data into a synchronous stream. The present invention is directed to a method and system of managing insertion of enhanced content metadata into a broadcast stream. The invention may be employed to deliver metadata to a receiver unit in a manner consistent with the Enhanced Content Specification from the Advanced Television Enhancement Forum (ATVEF).

A broadcast stream may be analog or digital. In an analog broadcast stream, a resource stream of metadata may be delivered during blanking intervals. A digital broadcast stream may be comprised of a program stream and a data stream. The program stream contains packets associated with rendering of a program. The data stream may contain packets comprising control information, metadata, or other information. In both analog and digital broadcast formats, a constant minimum bandwidth may be made available for the transfer of metadata. The present invention furnishes a method to determine a start time and duration of metadata transfer that maximizes system performance.

The invention may therefore comprise a method for inserting asynchronous data into a synchronous data stream comprising: receiving information including a first time value when the asynchronous data may be used, determining a transfer interval for the asynchronous data, inserting the asynchronous data into the synchronous data stream at a time prior to the first time value by an amount greater than or equal to the transfer interval.

The invention may further comprise a system for inserting asynchronous data into a synchronous data stream comprising: a database containing asynchronous data, an insertion controller, and a software program operable to determine a transfer interval for the asynchronous data and to commence insertion of the asynchronous data into the synchronous data stream at a time greater than or equal to the duration of the transfer interval prior to a time when the asynchronous data may be utilized.

Advantageously, the present invention also allows maximization of enhanced content transmission bandwidth by efficiently scheduling transmission, reducing periods of non-utilization between enhanced content reception and utilization.

BRIEF DESCRIPTION OF THE DRAWINGS

FIG. 1-B is a more detailed depiction of the operating environment of the present invention.

FIG. 1-C is a flowchart illustrating receiver software operation.

DETAILED DESCRIPTION OF THE PREFERRED EMBODIMENT OF THE INVENTION

Figure 1:
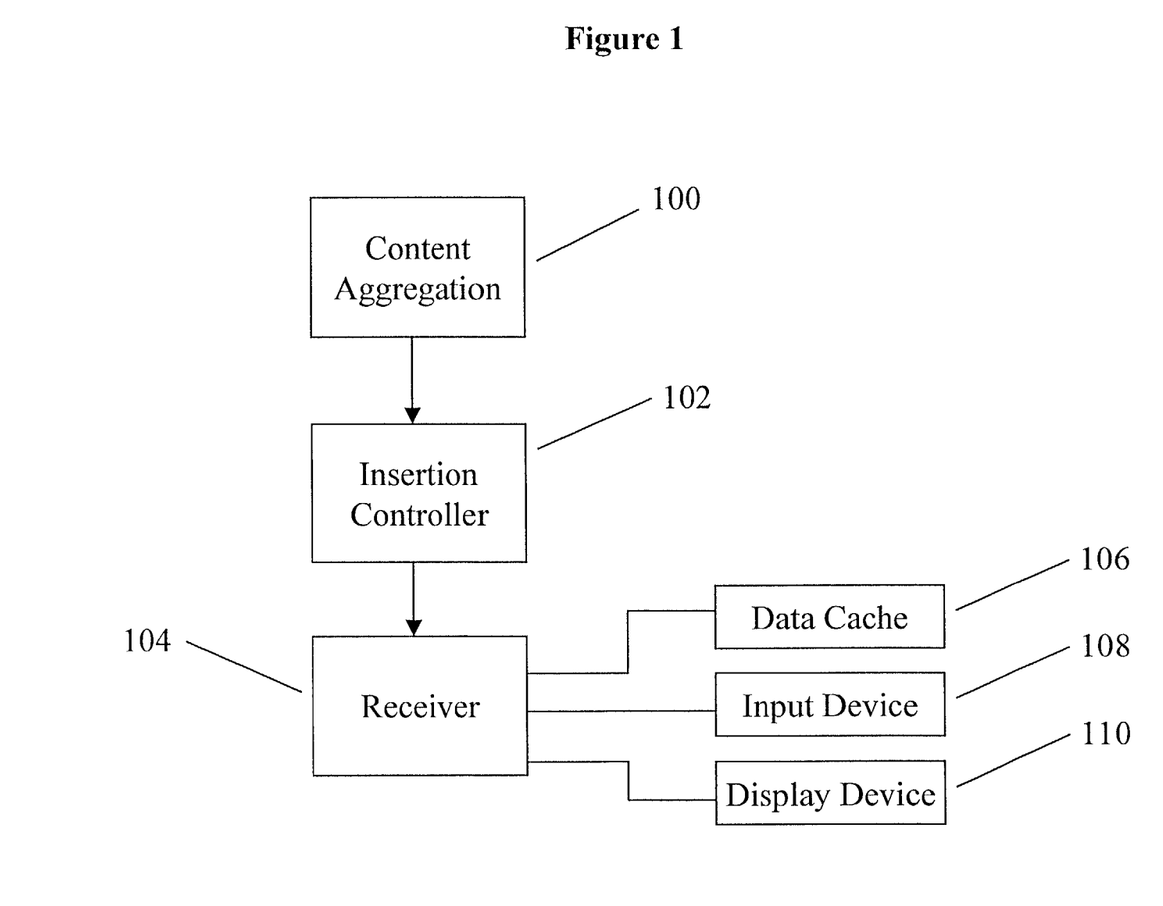
FIG. 1 depicts the operating environment of the present invention.

FIG. 1 depicts the operating environment of the present invention. Content aggregation unit 100 stores metadata to be inserted into a primary stream. A primary stream comprises non-enhanced program content such as movies, sitcoms, advertising, and sports programs, for example. Metadata stored in content aggregation unit 100 may be stored as individual assets where each asset corresponds to a specific insertion point in the primary stream. The asset may include code and data required to trigger and present an event on receiver 104. Content aggregation unit 100 may comprise a server and database containing metadata. Metadata is transferred from content aggregation unit 100 to insertion controller 102. A primary stream, not depicted, is provided to an input of insertion controller 102. Insertion controller 102 adds metadata to the primary stream from content aggregation unit 100. Insertion controller 102 may comprise a VBI (vertical blanking interval) insertion unit or an MPEG insertion unit such as those available from Norpak Corporation, a manufacturer of television equipment, with offices located at 10 Hearst Way, Kanata, Ontario Canada K2L 2P4.

An enhanced broadcast stream comprising primary stream content and metadata is broadcast from insertion controller 102 to receiver 104. The broadcast may employ cable, satellite, terrestrial, Internet, or other broadcast methods. Receiver 104 may be a set top box, personal computer, enhanced television or other device capable of receiving a television broadcast signal and metadata. Receiver 104 is coupled to data cache 106, input device 108, and display device 110. Data cache 106 may be employed to store metadata and primary content to produce an enhanced program stream that is output to display device 110. Data cache 106 may comprise memory devices such as RAM or a hard drive in a set top box or personal computer, for example. Input device 108 may be a remote control, mouse, keyboard, or other device for user input. Display device 110 may be a television monitor, computer monitor, or other display device such as a CRT projector, for example.

FIG. 1-B is a more detailed depiction of the operating environment of the present invention. Server 120 contains metadata that is supplied to insertion controller 122. Insertion controller 122 is a model TES5 Digital Inserter from Norpak Corporation. Digital video data 124 comprising primary content is input to insertion controller 122. Digital video 124 may be in a serial digital format compliant with the ANSI/SMPTE 259M format. Insertion controller 122 encodes data from server 120 into the vertical blanking interval of digital video data 124 and outputs the modified video signal to transmitter 126. Alternatively, the output from insertion controller 122 may be stored for later transmission. An enhanced video signal is transmitted from transmitter 126 to set top box 128. This signal may be compliant with type B transport as defined by the ATVEF Enhanced Content Specification. Set top box 128 may be an ATVEF compliant receiver. Set top box 128 parses information contained in the broadcast signal VBI for metadata and for triggers. Triggers may be text based, and their syntax may follow the basic format of the EIA-746A standard (7-bit ASCII, the high-order bit of the first byte must be "0"). Triggers may be transported in multicast IP packets or transport types other than an EIA-608 system. Metadata is stored in memory in set top box 128. Upon receipt of an enabled trigger associated with stored metadata, set top box 128 outputs metadata produced display information to display 130. The display information may be in HTML format. The method of the present invention may be implemented in the TES5 insertion controller 122 or in server 120. When the method of the present invention is implemented in insertion controller 122, requests for metadata may be sent across a 10 Base T LAN connection to server 120 which returns requested metadata for insertion. Server 120 may supply insertion information to insertion controller 122. Such information may comprise a description of when to commence insertion of metadata, and may employ control or other information in the primary content video input. For example, insertion controller 122 may be programmed to detect timing or control information in the primary content stream as a signal to commence metadata insertion. Other types of communication, such as serial ports, for example, may be used for communication between insertion controller 122 and server 120. If the method of the present invention is implemented on server 120, server 120 may receive primary content video information from insertion controller 122 or other device, not depicted. Server 120 transfers data to insertion controller 122 at a time reflecting the method of the present invention and in reference to timing or control information of the primary content video input. Further, if both insertion controller 122 and server 120 are programmable, the method of the present invention may be implemented in part on insertion controller 122 and server 120.

FIG. 1-C is a flowchart illustrating receiver software operation. At step 140, the receiver receives data. Data refers to non-primary content information. In analog systems, this may correspond to data encoded in the VBI (vertical blanking interval). The position of data within the VBI may be employed to define the data type, such as captioning, control, or metadata, for example. Data contained on line 22 of the VBI may be used for captioning. In digital systems, a packet header may identify data and the type of data. At step 142, data is checked to see if it is data other than trigger event data or metadata. If step 142 determines that the data is other data, step 144 processes the other data. If the result of step 142 is that the data is not other data, step 146 checks if the data is metadata. If the result of step 146 is that the data is metadata, step 148 stores the metadata in cache 106 of receiver 104. If the result of step 146 is that the data is not metadata, step 150 checks if the data is an enabled trigger. Triggers may be enabled or disabled by the user. A user may be prompted to receive enhanced content. If step 150 checks and determines that the data is not an enabled trigger, processing continues at step 140. If step 150 determines that the data is an enabled trigger, step 152 checks if valid metadata associated with the trigger is available in cache 106. If step 152 determines that valid metadata does not exist, processing continues at step 140. If step 152 determines that valid metadata does exist, step 154 executes the metadata or an application associated with the metadata. The application may display HTML images on display device 110.

Figure 2:
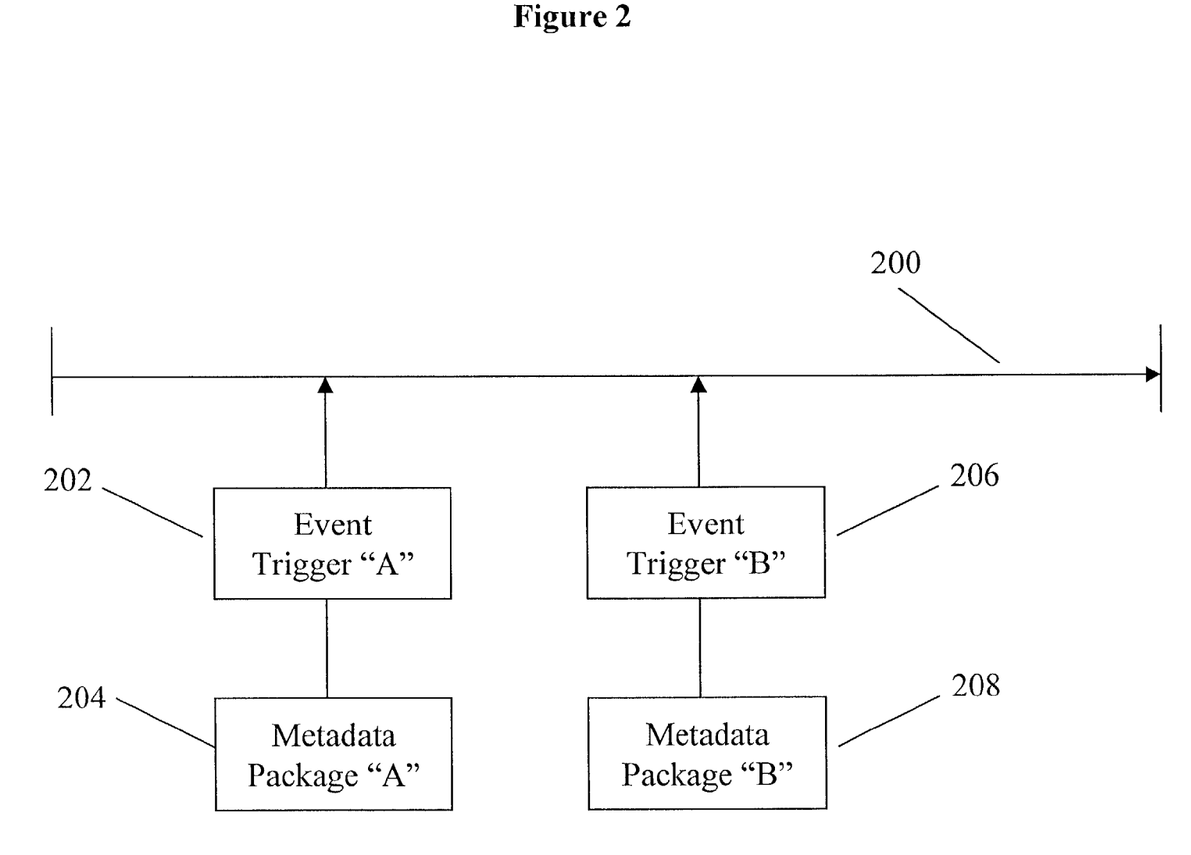
FIG. 2 depicts triggers and metadata utilization.

FIG. 2 depicts triggers and metadata utilization. Timeline 200 contains event trigger 'A' 202 that corresponds to a time when receiver 104 detects an enabled trigger. The broadcast stream may contain a plurality of triggers. The receiver may be configured to respond to none, some, or all of the triggers contained in the broadcast stream. When event trigger 'A' 202 is detected by receiver 104, metadata package 'A' 204 is utilized to produce enhanced content. Similarly, event trigger 'B' 206 corresponds to a time when receiver 104 detects another enabled trigger and initiates utilization of metadata package 'B' 208.

Metadata packages 202, 204 must be transferred to the receiver cache 106 prior to utilization thereof. As stated previously, both analog and digital transmission systems may provide a constant minimum bandwidth (isochronous channel) for metadata transmission. Data stream bandwidth that is not used by other data transfers, such as control information, captioning information, or program guides, for example, may also be used to transfer metadata. Software implementations of the present invention may be implemented in content aggregation unit 100, or may be implemented in insertion controller 102. The time at which metadata file transfer should commence in order to complete metadata file transfer prior to a corresponding trigger may be understood and implemented by the method of the following sections.

Figure 3:
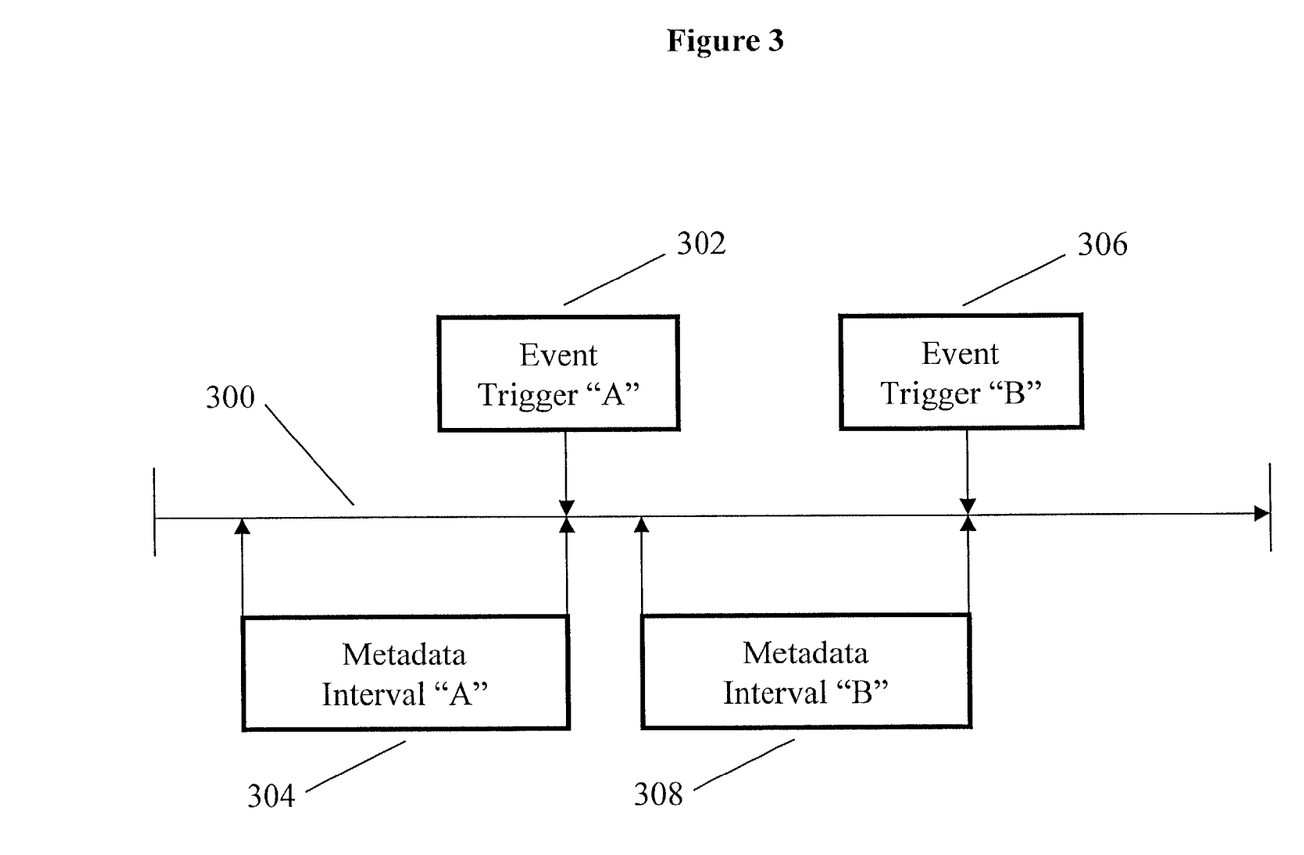
FIG. 3 depicts metadata intervals and associated triggers.

FIG. 3 depicts metadata intervals and associated triggers. Timeline 300 contains metadata interval 'A' 304 that depicts an interval to transfer metadata prior to event trigger 'A' 302. This figure depicts optimal performance timing in that there is no delay between the end of metadata interval 'A' 302 and trigger event 'A' 302.

If the data rate of metadata transfer is expressed as variable B, the interval to transfer a metadata file may be first expressed as:

$$(A/B) \qquad (1)$$

where A is the size of the metadata file.

Further, the metadata file may be transmitted more than once. The interval to transfer a metadata file and redundant data then may be expressed as:

$$R(A/B) \qquad (2)$$

where R is a redundancy factor. Metadata may contain a checksum or other error detection coding such that display of erroneous or corrupted data may be inhibited.

If the metadata file is transferred 'just in time', the interval may be expressed as $$T-R(A/B) \text{ to } T \qquad (3)$$

where T in the event trigger point.

This interval is represented by the width of the box designated metadata interval 'A' in FIG. 3.

In some systems, such as some Type A transport systems, a network connection may be made prior to utilization of the metadata. Establishing a network connection may produce a connect time C. The interval for transferring metadata is then shifted by C and may be expressed as:

$$T-C-R(A/B) \text{ to } T-C. \qquad (4)$$

Figure 4:
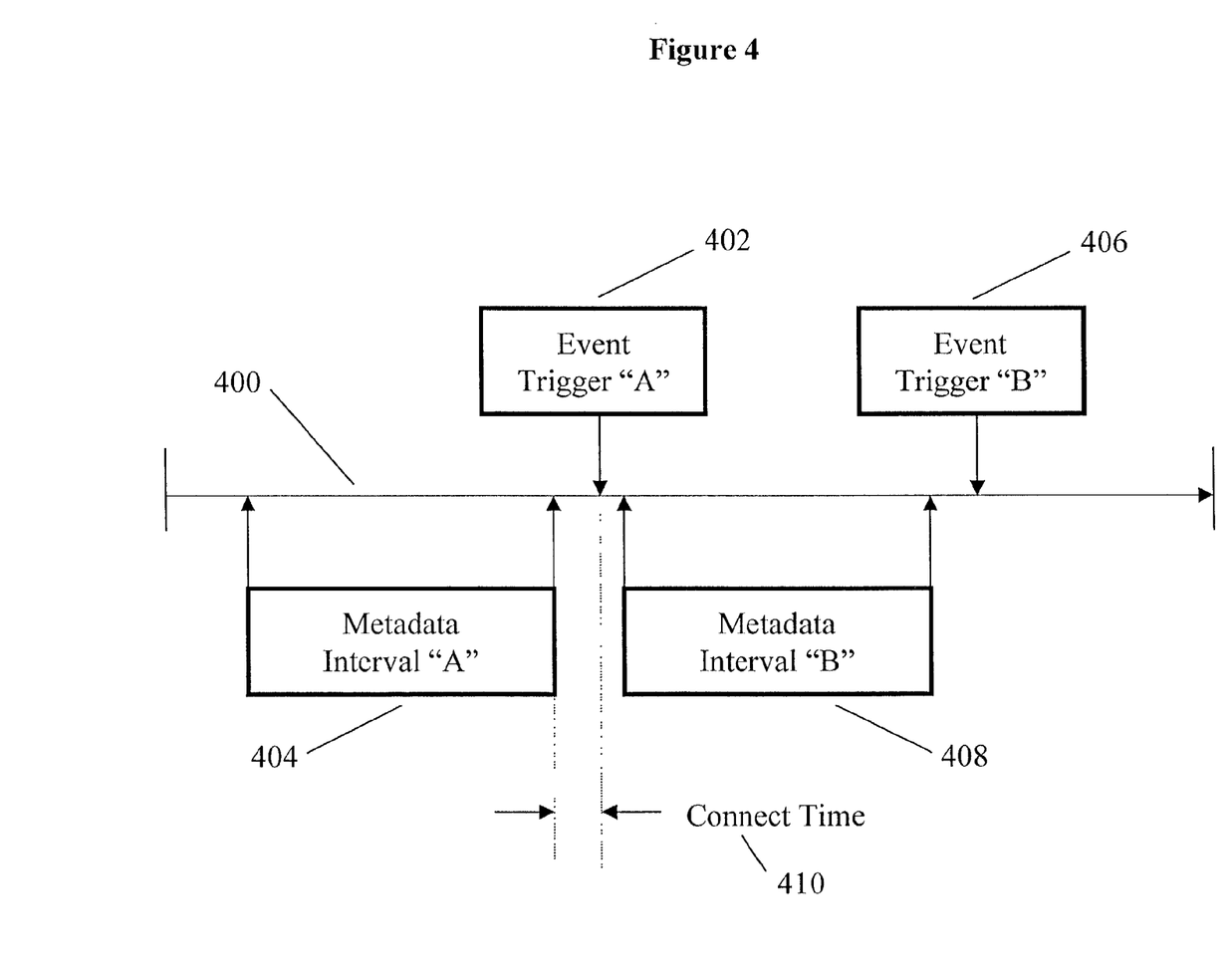
FIG. 4 depicts how connect time C affects the transfer interval.

FIG. 4 depicts how connect time C may affect the transfer interval. Timeline 400 indicates periods of time progressing from earlier on the left to later on the right. Metadata interval 'A' 404 may be used to transfer data in preparation for event trigger 'A' 402. The duration between the end of metadata interval 'A' 404 and event trigger 'A' 402 is connect time (C) 410.

As noted earlier, a broadcast channel may be considered to consist of a program stream and a data stream. Data streams may be used for metadata transfer, plus transfer of other information components such as data feed, time signals, media templates, bitmaps, graphics, and logos, for example. The transfer of other information may reduce the bandwidth available for metadata transfer. The bandwidth utilized by other information may be expressed as a ratio M of the total data stream bandwidth. The ratio M may be determined by summing the ratios $L_i$ for each of the information components.

$$M = \sum_{n=1}^{n} L_i \qquad (5)$$

The ratio M may be used to bound a scale factor K as shown below.

$$K \leq 1-M \qquad (6)$$

The scale factor K reflects the portion of data stream bandwidth available for metadata transfer. Taking scale factor K into consideration, the interval for metadata transfer may be described as:

$$(T-R(A/KB)) \text{ to } T \qquad (7)$$

where T is the time of the trigger event.

As noted earlier, in some systems, receiver 104 may require a network connection to fully present an interactive event. The network connection may require a server query or dial-up network access, resulting in a connect time C before metadata may be utilized. During connect time C, some systems may not be able to receive transfers of metadata. Connect time C may also reflect time required to launch an application, such as a new window, for example, on receiver 104. To accommodate a duration C during which metadata is not transferred, the transfer interval may be advanced in time as shown below.

$$(T-C-R(A/KB)) \text{ to } (T-C) \qquad (8)$$

where C is the connect time.

There may be multiple trigger events in a program stream. When the duration between trigger events is less than the metadata interval for a later event, the scheduling of an earlier metadata interval is advanced to allow sufficient time to transfer the metadata files.

Figure 5:
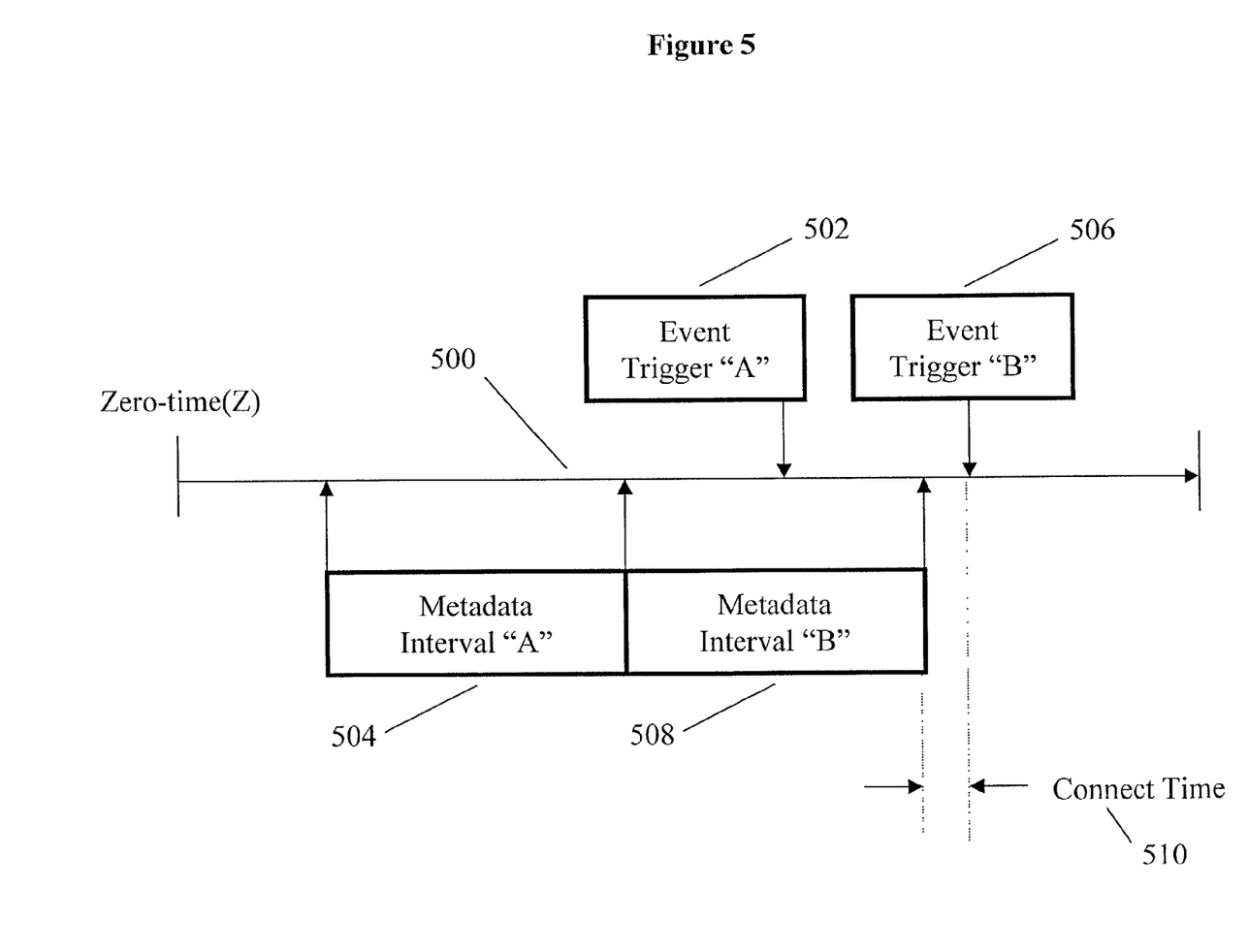
FIG. 5 depicts modified metadata interval scheduling.

FIG. 5 depicts modified metadata interval scheduling. In FIG. 5 it is observed that the duration on timeline 500 from event trigger 'A' 502 to event trigger 'B' 506 is less than the duration of metadata interval 'B' 508. In order to transfer metadata associated both with event trigger 'A' 502 and event trigger 'B' 508, the time at which metadata interval 'A' 504 commences is shifted left (earlier) in time toward the beginning of the program or primary stream. The beginning of the program stream may be referred to as Zero Time (Z).

Modified metadata interval scheduling, as shown in FIG. 5, may require that sufficient storage is available in data cache 106 of receiver 104. When metadata intervals are positioned adjacently, the starting time of the first metadata interval may be determined by summing the intervals for each metadata transfer and commencing the first metadata interval at a time greater than or equal the sums of the intervals prior to the time of the last event trigger.

Figure 6:
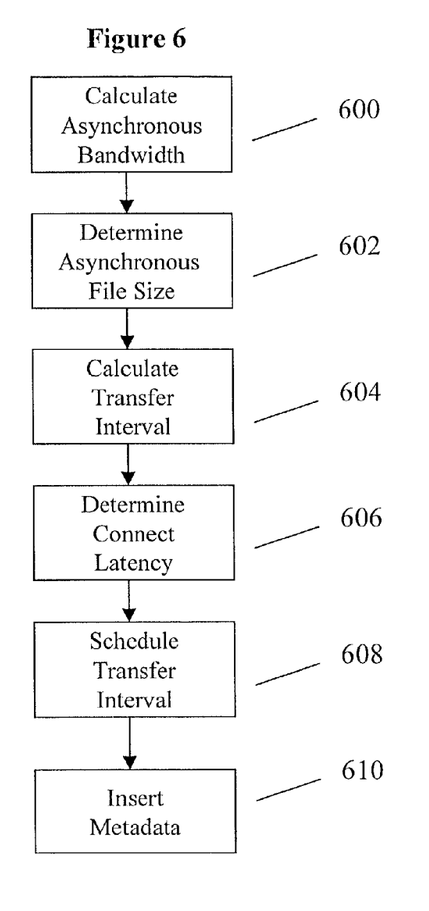
FIG. 6 is a flowchart depicting the method of the invention.

FIG. 6 is a flowchart depicting the method of the invention. The method of the present invention may be implemented using software, hardware, or a combination thereof. At step 600, a software program may determine the bandwidth available for transmission of metadata. This calculation may employ any or all of equations 1 to 7. Alternate forms of these equations may be employed. Further, if bandwidth information is limited or not available, as may be the case for a real-time or near real-time feed, a bandwidth value equal to the isochronous rate assigned to metadata may be used. It should be noted that the equations of the method of the present invention allow utilization of other data bandwidth in addition to the isochronous rate that may be assigned to metadata, thereby providing higher performance. At step 602 the size of the asynchronous file to be transferred is determined. This determination may include repeated transmission of a data set for redundancy. At step 604 the metadata interval is calculated by dividing the asynchronous file size by the asynchronous bandwidth available for transmission of metadata. At step 606, a connect latency is determined. Such determination may involve accessing a latency value from a table. At step 608 the transfer interval is scheduled. Scheduling for single trigger events comprises determining a time prior to the time of the trigger by a value greater than or equal to the duration of the transfer interval plus the connect time, if any. Scheduling for multiple trigger events may comprise determining a time for commencing a first metadata transfer interval that is prior to the last trigger event by a value greater than or equal to the sum of all metadata intervals, plus connect times, if any. At step 610, time information from the primary content stream is compared to the determined time for commencing metadata transfer and transfer is commenced if the time information is equal to the determined time or is within a specified amount of the determined time.

From the described methods of scheduling metadata transfer, metadata transfer intervals may be scheduled in a manner that provides optimized bandwidth utilization. In contrast to closed captioning data transfer which may employ only line 22 of the vertical blanking interval, the present invention may utilize unused bandwidth that at times may be used for control or other information, thereby providing increased metadata transfer performance. Different metadata may be transferred to different viewers, reflecting local, regional, or viewer preferences. As such, multiple instances of the present invention may be employed to transfer the different metadata.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

We claim:

1. A method for inserting asynchronous data into a synchronous data stream comprising:
   receiving information including a first time value when said asynchronous data may be used;
   determining a transfer interval for said asynchronous data;
   inserting said asynchronous data into said synchronous data stream at a time prior to said first time value by an amount that is greater than or equal to said transfer interval;
   wherein determining the transfer interval further comprises:
   determining a file size of said asynchronous data;
   determining a data transfer rate for said asynchronous data;
   dividing said file size by said data transfer rate to calculate a duration;
   determining a ratio of data stream bandwidth available for transfer of said asynchronous data; and
   modifying said duration by multiplying said duration by the inverse of said ratio.

2. The method of claim 1 wherein modifying said duration further comprises:
   obtaining a connect time; and
   adding said connect time to said duration.

3. A method for inserting asynchronous data into a synchronous television broadcast stream comprising:
   receiving information including a first time value when said asynchronous data may be used;
   determining a transfer interval for said asynchronous data;
   inserting said asynchronous data into said synchronous television broadcast stream at a time prior to said first time value by an amount that is greater than or equal to said transfer interval;
   wherein determining the transfer interval further comprises:
   determining a file size of said asynchronous data;
   determining a data transfer rate for said asynchronous data;
   dividing said file size by said data transfer rate to calculate a duration;
   determining a ratio of data stream bandwidth available for transfer of said asynchronous data; and
   modifying said duration by multiplying said duration by the inverse of said ratio.

4. The method of claim 3 wherein modifying said duration further comprises:
   obtaining a connect time; and
   adding said connect time to said duration.

* * * * *